US011448992B2

(12) United States Patent
Oda et al.

(10) Patent No.: US 11,448,992 B2
(45) Date of Patent: Sep. 20, 2022

(54) IMAGE FORMING APPARATUS, IMAGE FORMING SYSTEM AND METHOD OF CONTROLLING IMAGE FORMING SYSTEM

(71) Applicant: CANON KABUSHIKI KAISHA, Tokyo (JP)

(72) Inventors: Yuichiro Oda, Kanagawa (JP); Koji Yumoto, Ibaraki (JP); Riki Fukuhara, Chiba (JP); Yuko Kiyota, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 19 days.

(21) Appl. No.: 17/173,589

(22) Filed: Feb. 11, 2021

(65) Prior Publication Data

US 2021/0255572 A1 Aug. 19, 2021

(30) Foreign Application Priority Data

Feb. 19, 2020 (JP) ............................ JP2020-025941

(51) Int. Cl.
*G03G 21/18* (2006.01)
*G03G 15/00* (2006.01)

(52) U.S. Cl.
CPC ..... *G03G 15/6538* (2013.01); *G03G 15/6573* (2013.01); *G03G 21/1882* (2013.01); *B65H 2557/25* (2013.01)

(58) Field of Classification Search
CPC ............ B65H 2557/25; B65H 2402/62; B65H 2557/12
See application file for complete search history.

(56) References Cited

U.S. PATENT DOCUMENTS 5,164,769 A * 11/1992 Hashimoto ............ G03G 15/50 399/361
2007/0040328 A1* 2/2007 Hattori ............... G03G 15/6573 271/293
2008/0170604 A1* 7/2008 Komoda ............. H04L 25/0272 375/214
2014/0042686 A1* 2/2014 Konishi ............. G03G 21/1652 270/58.31
2014/0300930 A1* 10/2014 Kawai .................... G03G 15/50 358/1.15

FOREIGN PATENT DOCUMENTS

JP 2007-156100 A 6/2007

* cited by examiner

*Primary Examiner* — Jennifer Bahls
(74) *Attorney, Agent, or Firm* — Venable LLP

(57) ABSTRACT

An image forming apparatus to which a sheet treating apparatus is to be connected includes a communication device, having a serial port used for serial communication with the sheet treating apparatus and a parallel port used for parallel communication with the sheet treating apparatus, to communicate with the sheet treating apparatus, and one or more processors. At least one of the one or more processors operates to determine a communication method to communicate with the sheet treating apparatus based on configuration information representing a connection configuration of the sheet treating apparatus, and switch an operation of the serial port such that the serial port of the communication device is used in the parallel communication in a case where a determined communication method is a method in which the parallel communication is performed and the serial communication is not performed.

13 Claims, 12 Drawing Sheets

| | COMMUNICATION METHOD | NUMBER OF SIGNAL LINES |
|---|---|---|
| IMAGE FORMING APPARATUS | SERIAL<br>PARALLEL | 5<br>(FIRST SIGNAL LINE: 2)<br>(SECOND SIGNAL LINE: 3) |

| | COMMUNICATION METHOD | NUMBER OF SIGNAL LINES REQUIRED FOR COMMUNICATION | DETAILS OF SIGNAL | SIGNAL CONNECTION DESTINATION |
|---|---|---|---|---|
| FIRST SHEET FEEDING DEVICE | SERIAL | 2 | TRANSMISSION SIGNAL<br>RECEPTION SIGNAL | FIRST SIGNAL LINE |
| SECOND SHEET FEEDING DEVICE | PARALLEL | 3 | ONLINE SIGNAL<br>SHEET FEED SIGNAL<br>SHEET ABSENCE SIGNAL | SECOND SIGNAL LINE |
| THIRD SHEET FEEDING DEVICE (FUNCTION RESTRICTION 1) | PARALLEL | 2 | ONLINE SIGNAL<br>UPPER TRAY SHEET FEED SIGNAL | FIRST SIGNAL LINE |
| THIRD SHEET FEEDING DEVICE (FUNCTION RESTRICTION 2) | PARALLEL | 3 | ONLINE SIGNAL<br>UPPER TRAY SHEET FEED SIGNAL<br>LOWER TRAY SHEET FEED SIGNAL | SECOND SIGNAL LINE |
| THIRD SHEET FEEDING DEVICE (NORMAL FUNCTION) | PARALLEL | 5 | ONLINE SIGNAL<br>UPPER TRAY SHEET FEED SIGNAL<br>LOWER TRAY SHEET FEED SIGNAL<br>UPPER TRAY SHEET ABSENCE SIGNAL<br>LOWER TRAY SHEET ABSENCE SIGNAL | THIRD SIGNAL LINE |

| | COMMUNICATION METHOD | NUMBER OF SIGNAL LINES |
|---|---|---|
| IMAGE FORMING APPARATUS | SERIAL<br>PARALLEL | 5<br>(FIRST SIGNAL LINE: 2)<br>(SECOND SIGNAL LINE: 3) |

| | COMMUNICATION METHOD | NUMBER OF SIGNAL LINES REQUIRED FOR COMMUNICATION | DETAILS OF SIGNAL | SIGNAL CONNECTION DESTINATION |
|---|---|---|---|---|
| FIRST SHEET FEEDING DEVICE | SERIAL | 2 | TRANSMISSION SIGNAL<br>RECEPTION SIGNAL | FIRST SIGNAL LINE |
| SECOND SHEET FEEDING DEVICE | PARALLEL | 3 | ONLINE SIGNAL<br>SHEET FEED SIGNAL<br>SHEET ABSENCE SIGNAL | SECOND SIGNAL LINE |
| THIRD SHEET FEEDING DEVICE (FUNCTION RESTRICTION 1) | PARALLEL | 2 | ONLINE SIGNAL<br>UPPER TRAY SHEET FEED SIGNAL | FIRST SIGNAL LINE |
| THIRD SHEET FEEDING DEVICE (FUNCTION RESTRICTION 2) | PARALLEL | 3 | ONLINE SIGNAL<br>UPPER TRAY SHEET FEED SIGNAL<br>LOWER TRAY SHEET FEED SIGNAL | SECOND SIGNAL LINE |
| THIRD SHEET FEEDING DEVICE (NORMAL FUNCTION) | PARALLEL | 5 | ONLINE SIGNAL<br>UPPER TRAY SHEET FEED SIGNAL<br>LOWER TRAY SHEET FEED SIGNAL<br>UPPER TRAY SHEET ABSENCE SIGNAL<br>LOWER TRAY SHEET ABSENCE SIGNAL | THIRD SIGNAL LINE |

FIG. 9

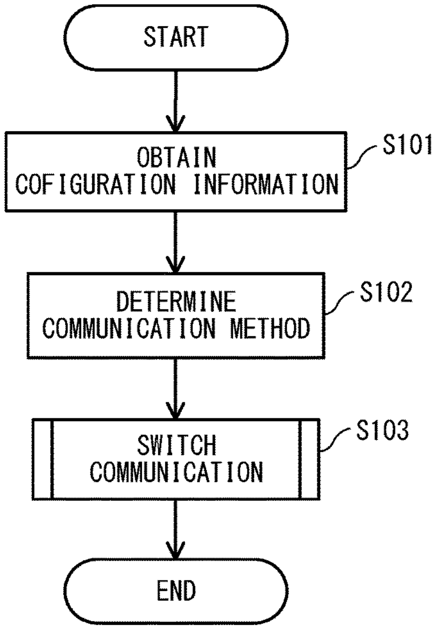

FIG. 10

| | CONNECTION WITH IMAGE FORMING APPARATUS | | | | | | |
|---|---|---|---|---|---|---|---|
| FIRST SHEET FEEDING DEVICE | NOT CONNECTED | CONNECTED | NOT CONNECTED | CONNECTED | CONNECTED | NOT CONNECTED | NOT CONNECTED |
| SECOND SHEET FEEDING DEVICE | NOT CONNECTED | NOT CONNECTED | CONNECTED | CONNECTED | NOT CONNECTED | CONNECTED | NOT CONNECTED |
| THIRD SHEET FEEDING DEVICE | NOT CONNECTED | NOT CONNECTED | NOT CONNECTED | NOT CONNECTED | CONNECTED | CONNECTED | CONNECTED |
| COMBINATION NUMBER | 1 | 2 | 3 | 4 | 5 | 6 | 7 |

FIG. 11

| | COMBINATION NUMBER | | | | | | |
|---|---|---|---|---|---|---|---|
| | 1 | 2 | 3 | 4 | 5 | 6 | 7 |
| FIRST SIGNAL LINE | — | FIRST COMMUNICATION METHOD | — | FIRST COMMUNICATION METHOD | FIRST COMMUNICATION METHOD | THIRD COMMUNICATION METHOD (FUNCTION RESTRICTION 1) | THIRD COMMUNICATION METHOD |
| SECOND SIGNAL LINE | — | — | SECOND COMMUNICATION METHOD | SECOND COMMUNICATION METHOD | THIRD COMMUNICATION METHOD (FUNCTION RESTRICTION 2) | SECOND COMMUNICATION METHOD | |

| | |
|---|---|
| FIRST COMMUNICATION METHOD | COMMUNICATION BETWEEN IMAGE FORMING APPARATUS AND FIRST SHEET FEEDING DEVICE |
| SECOND COMMUNICATION METHOD | COMMUNICATION BETWEEN IMAGE FORMING APPARATUS AND SECOND SHEET FEEDING DEVICE |
| THIRD COMMUNICATION METHOD | COMMUNICATION BETWEEN IMAGE FORMING APPARATUS AND THIRD SHEET FEEDING DEVICE (USING 5 SIGNAL LINES) |
| THIRD COMMUNICATION METHOD (FUNCTION RESTRICTION 1) | COMMUNICATION BETWEEN IMAGE FORMING APPARATUS AND THIRD SHEET FEEDING DEVICE (USING 2 SIGNAL LINES) |
| THIRD COMMUNICATION METHOD (FUNCTION RESTRICTION 2) | COMMUNICATION BETWEEN IMAGE FORMING APPARATUS AND THIRD SHEET FEEDING DEVICE (USING 3 SIGNAL LINES) |

FIG. 12

IMAGE FORMING APPARATUS, IMAGE FORMING SYSTEM AND METHOD OF CONTROLLING IMAGE FORMING SYSTEM

BACKGROUND OF THE INVENTION

Field of the Invention

The present disclosure relates to an image forming apparatus to which a sheet treating apparatus is connected.

DESCRIPTION OF THE RELATED ART

An image forming apparatus is used in fields requiring large print volumes such as variable printing related to bookbinding and on-demand publishing since high image quality and high speed printing has been achieved. With this circumstance, a sheet treating apparatus has been provided as an optional device to be connected to the image forming apparatus. The sheet treating apparatus includes a sheet feeding device capable of feeding various types of sheets to the image forming apparatus, a post processing device having a sheet sorting function, a binding processing function, and a folding processing function for sheets output from the image forming apparatus. The sheet treating apparatus and the image forming apparatus communicate with each other via serial communication in accordance with a communication protocol or via parallel communication using a plurality of signal lines. Japanese Patent Application Laid-open No. 2007-156100 describes a system in which complicated control such as sheet sorting processing, binding processing, folding processing, and the like for the sheets output from the image forming apparatus are performed by transmitting and receiving sheet information between devices via serial communication according to a communication protocol.

The sheet treating apparatus may be provided by a manufacturer of the image forming apparatus, and, in some cases, it may be provided by another company, which is different from the manufacturer of the image forming apparatus. When communication is performed between devices via serial communication, in order to expand functions in cooperation with the sheet treating apparatus provided by another company, it is necessary to accommodate a communication protocol of the image forming apparatus and a communication protocol of the other company. When performing parallel communication between devices, in order to expand functions in cooperation with the sheet treating apparatus provided by another company, the number of the signal lines of the parallel communication of the image forming apparatus should match the number of the signal lines of the parallel communication required by the sheet treating apparatus provided by another company. In a case where the number of signal lines does not match, the sheet treating apparatus cannot be connected to the image forming apparatus. In view of the above, one of the objects of the present invention is to provide the image forming apparatus with an improved degree of freedom of connection with the sheet treating apparatus.

SUMMARY OF THE INVENTION

An image forming apparatus according to the present disclosure includes: a communication device, having a serial port used for serial communication with the sheet treating apparatus and a parallel port used for parallel communication with the sheet treating apparatus, configured to communicate with the sheet treating apparatus, one or more processors, at least one of the one or more processors operating to: determine a communication method to communicate with the sheet treating apparatus based on configuration information representing a connection configuration of the sheet treating apparatus, and switch an operation of the serial port such that the serial port of the communication device is used in the parallel communication in a case where a determined communication method is a method in which the parallel communication is performed and the serial communication is not performed.

Further features of the present invention will become apparent from the following description of exemplary embodiments (with reference to the attached drawings).

BRIEF DESCRIPTION OF THE DRAWINGS

FIG. 9 is an explanatory diagram of a method for determining a communication method.

FIG. 10 is a flowchart illustrating a process for determining a communication method.

FIG. 11 is an explanatory diagram of configuration information.

FIG. 12 is an explanatory diagram of processing for determining a communication method.

DESCRIPTION OF THE EMBODIMENTS

In the following, an embodiment of the present invention is described in detail with reference to the accompanying drawings. It is noted that the technical scope of the present invention is determined based on the attached claims, and is not limited by the following individual embodiments.

<Overview>

FIGS. 1A to 1D and FIGS. 2A to 2C are exemplary diagrams of an image forming system including an image forming apparatus of the present embodiment. The image forming system of the present embodiment includes an image forming apparatus 101 alone, or a combination of the image forming apparatus 101 and a sheet treating apparatus as an optional device. One or more sheet treating apparatus can be connected to the image forming apparatus 101. In the following, an embodiment in which a sheet feeding device is used as the sheet treating apparatus will be described.

Figure 1A:
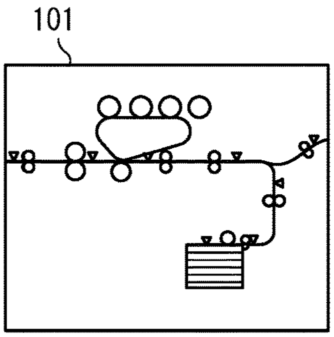
FIG. 1A, FIG. 1B, FIG. 1C, and FIG. 1D are exemplary configuration diagrams of an image forming system.
Figure 1B:
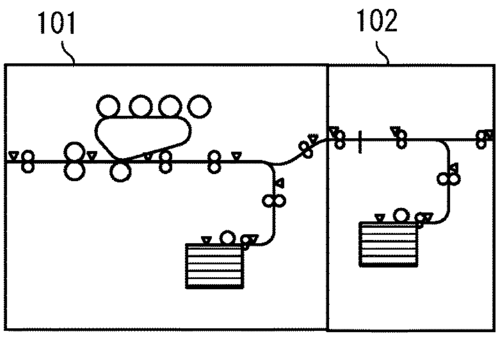
Figure 1C:
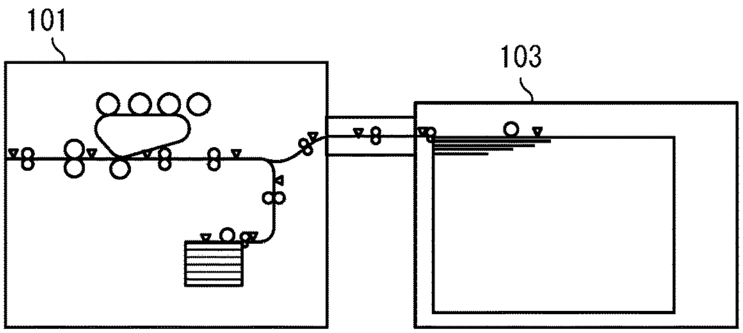
Figure 1D:
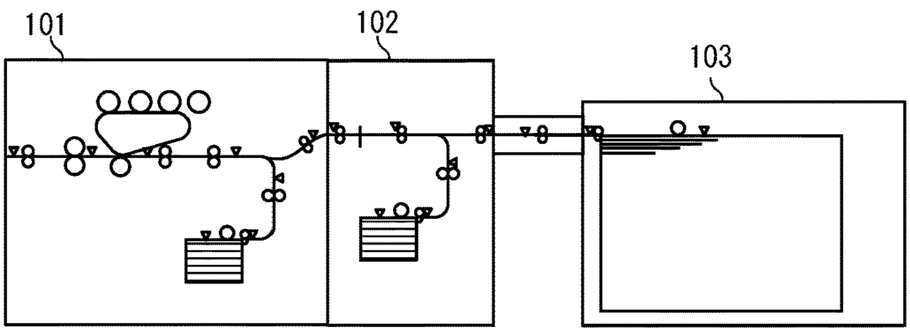
Figure 2A:
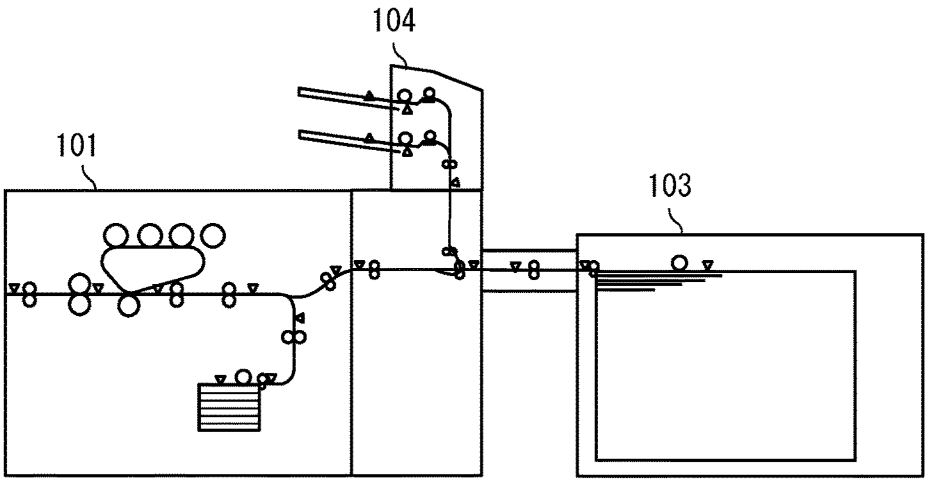
FIG. 2A, FIG. 2B, and FIG. 2C are exemplary configuration diagrams of an image forming system.
Figure 2B:
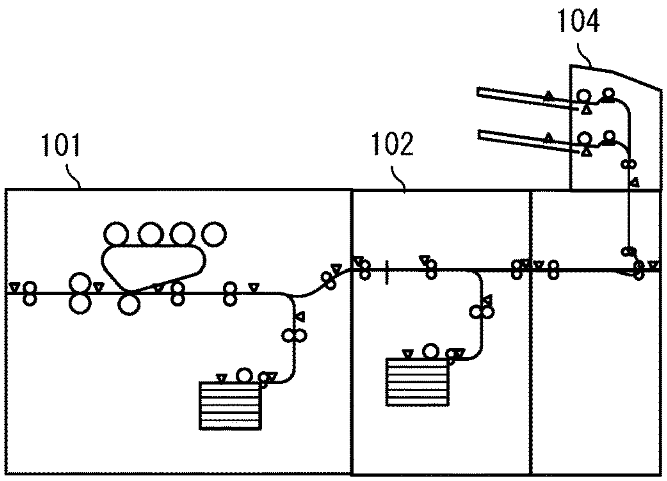
Figure 2C:
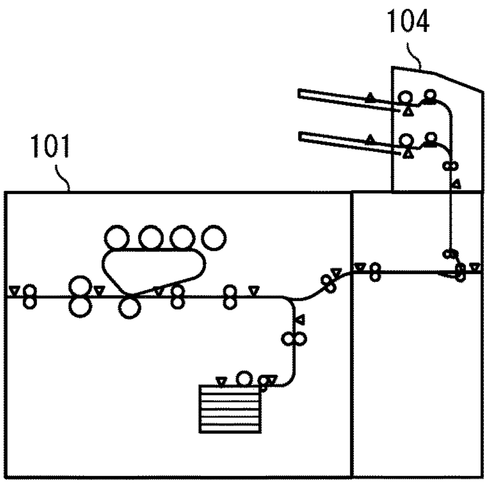

FIG. 1A is a configuration diagram of the image forming apparatus 101 in which the sheet feeding device as the sheet treating apparatus is not connected. FIG. 1B is a configuration diagram in which a first sheet feeding device 102 is connected to the image forming apparatus 101. A sheet is supplied from the first sheet feeding device 102 to the image forming apparatus 101. FIG. 1C is a configuration diagram in which a second sheet feeding device 103, which is different from the first sheet feeding device 102, is connected to the image forming apparatus 101. The sheet is fed from the second sheet feeding device 103 to the image forming apparatus 101. FIG. 1D is a configuration diagram in which the first sheet feeding device 102 and the second sheet feeding device 103 are connected to the image forming apparatus 101. The sheet is fed from the first sheet feeding device 102 to the image forming apparatus 101. The sheet is fed from the second sheet feeding device 103 to the image forming apparatus 101 via the first sheet feeding device 102. FIG. 2A is a configuration diagram in which the third sheet feeding device 104 and the second sheet feeding device 103 are connected to the image forming apparatus 101. A third sheet feeding device 104 is different from the first sheet feeding device 102 and the second sheet feeding device 103. The sheet is fed from the third sheet feeding device 104 to the image forming apparatus 101. The sheet is fed from the second sheet feeding device 103 to the image forming apparatus 101 via the third sheet feeding device 104. FIG. 2B is a configuration diagram in which the first sheet feeding device 102 and the third sheet feeding device 104 are connected to the image forming apparatus 101. The sheet is fed from the first sheet feeding device 102 to the image forming apparatus 101. The sheet is fed from the third sheet feeding device 104 to the image forming apparatus 101 via the first sheet feeding device 102. FIG. 2C is a configuration diagram in which the third sheet feeding device 104 is connected to the image forming apparatus 101. The sheet is fed from the third sheet feeding device 104 to the image forming apparatus 101.

FIGS. 3A to 3D and FIGS. 4A to 4C are exemplary configuration diagrams of a communication system of the image forming system. Each of the first sheet feeding device 102, the second sheet feeding device 103, and the third sheet feeding device 104 is connected to the image forming apparatus 101 via any one of a first signal line 120, a second signal line 130, and a third signal line 140. The first signal line 120 is used for serial communication. The second signal line 130 is used for parallel communication. The third signal line 140 is a signal line which is a combination of the first signal line 120 and the second signal line 130.

Figure 3A:
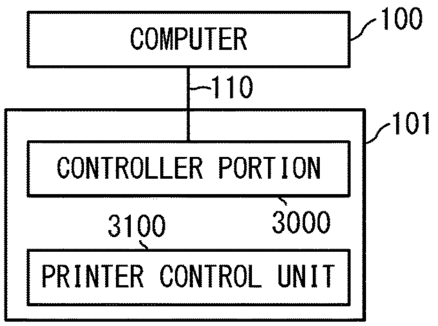
FIG. 3A, FIG. 3B, FIG. 3C, and FIG. 3D are exemplary configuration diagrams of a communication system of an image forming system.
Figure 3B:
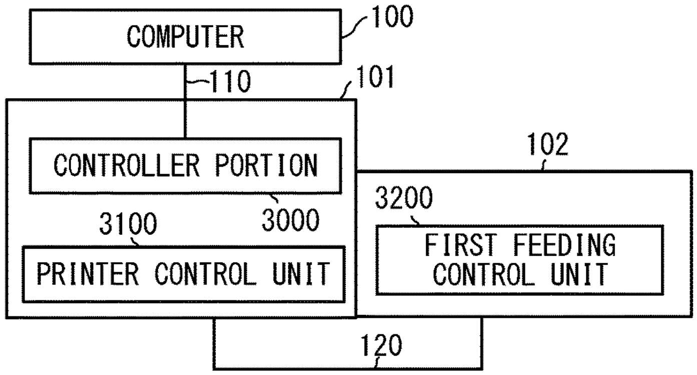
Figure 3C:
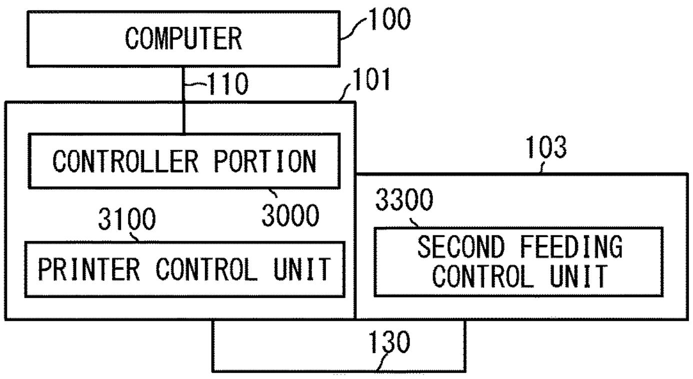
Figure 3D:
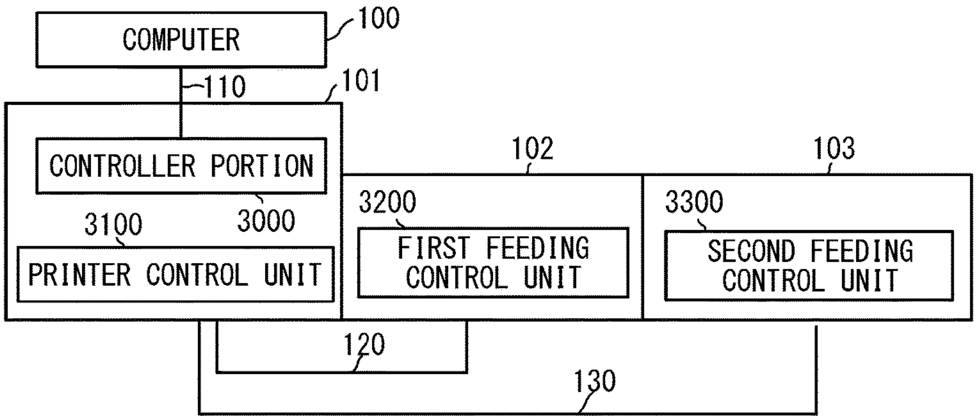
Figure 4A:
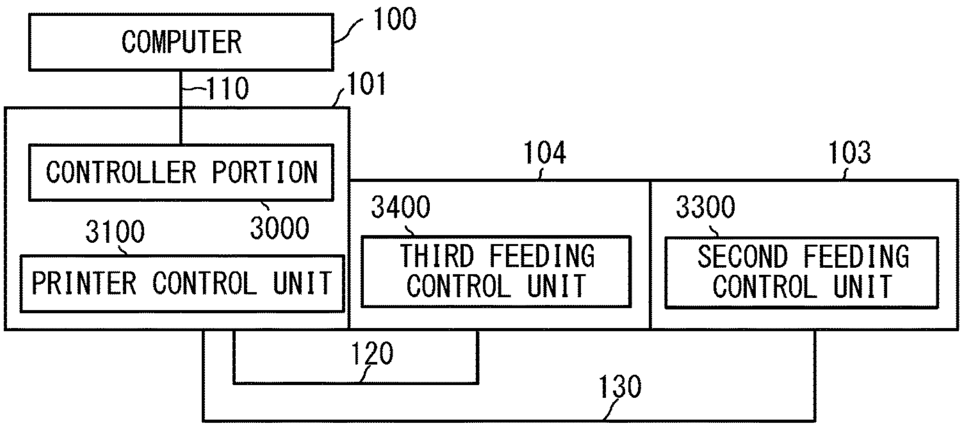
FIG. 4A, FIG. 4B, and FIG. 4C are exemplary configuration diagrams of a communication system of an image forming system.
Figure 4B:
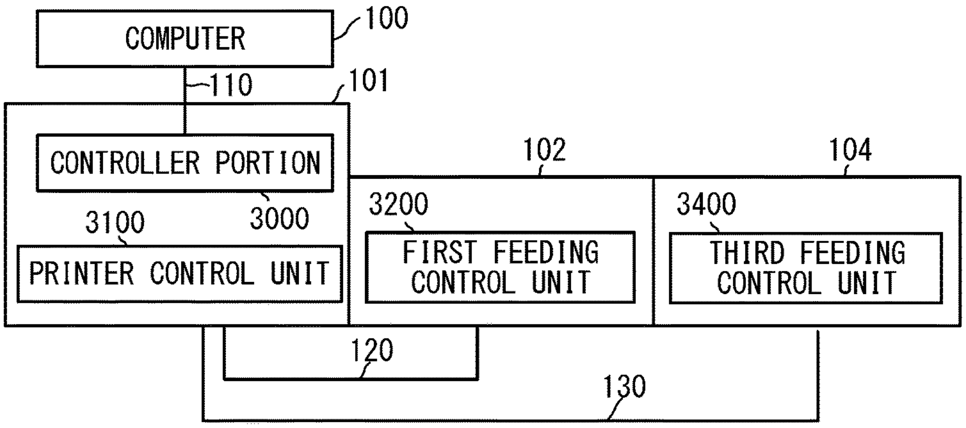
Figure 4C:
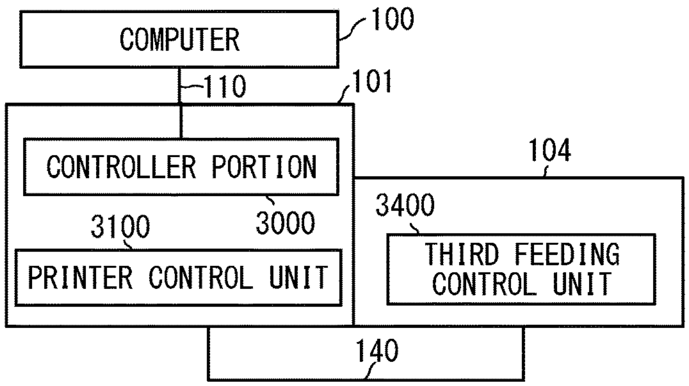

The configuration of FIG. 3A corresponds to the configuration of FIG. 1A. Since none of the sheet feeding devices is connected to the image forming apparatus 101, none of the first signal line 120, the second signal line 130, and the third signal line 140 is connected to the image forming apparatus 101. The configuration of FIG. 3B, which illustrates a configuration in which the image forming apparatus 101 and the first sheet feeding device 102 are connected via the first signal line 120, corresponds to the configuration of FIG. 1B. The configuration of FIG. 3C, which illustrates a configuration in which the image forming apparatus 101 and the second sheet feeding device 103 are connected via the second signal line 130, corresponds to the configuration of FIG. 1C. The configuration of FIG. 3D corresponds to the configuration of FIG. 1D. In the configuration of FIG. 3D, the image forming apparatus 101 and the first sheet feeding device 102 are connected via the first signal line 120, and the image forming apparatus 101 and the second sheet feeding device 103 are connected via the second signal line 130. The configuration of FIG. 4A corresponds to the configuration of FIG. 1A. In the configuration of FIG. 4A, the image forming apparatus 101 and the third sheet feeding device 104 are connected via the first signal line 120, and the image forming apparatus 101 and the second sheet feeding device 103 are connected via the second signal line 130. The configuration of FIG. 4B corresponds to the configuration of FIG. 2B. In the configuration of FIG. 4B, the image forming apparatus 101 and the first sheet feeding device 102 are connected via the first signal line 120, and the image forming apparatus 101 and the third sheet feeding device 104 are connected via the second signal line 130. The configuration of FIG. 4C, which illustrates a configuration in which the image forming apparatus 101 and the third sheet feeding device 104 are connected via the third signal line 140, corresponds to the configuration of FIG. 2C.

The image forming apparatus 101 is connected to a computer 100, which is an external apparatus, via a predetermined network 110. The network 110 is a LAN (Local Area Network), a WAN (Wide Area Network), a public communication line, or the like, for example. The image forming apparatus 101 includes a controller unit 3000 and a printer control unit 3100. The controller unit 3000 receives image data and document data transmitted from the computer, performs job management, and controls a printing operation performed by the printer control unit 3100. The controller unit 3000 controls the printer control unit 3100 to convey the sheet and to perform processing of forming a visible image on the sheet based on the image data or the like.

The first sheet feeding device 102 includes a first feeding control unit 3200 for conveying the sheets. The second sheet feeding device 103 includes a second feeding control unit 3300 for conveying the sheets. The third sheet feeding device 104 includes a third feeding control unit 3400 for conveying the sheets.

Image data representing an image or a document generated by the computer 100, or document data is transmitted to the image forming apparatus 101 via the network 110. The image forming apparatus 101 forms, according to the image data and the document data received by the controller unit 3000, an image on the sheet by the printer control unit 3100. The image forming apparatus 101 controls the conveyance of the sheet via any one of the first signal line 120, the second signal line 130, and the third signal line 140, by transmitting and receiving, between the image forming apparatus 101 and the sheet feeding device, sheet information and timing information for controlling a sheet transfer timing. That is, each of the first feeding control unit 3200, the second feeding control unit 3300, and the third feeding control unit 3400 controls the conveyance of the sheet by transmitting and receiving the sheet information and the timing information to and from the printer control unit 3100 of the image forming apparatus 101. As a result, a designated sheet, designated by the computer 100, is conveyed to form an image on the designated sheet.

<Control Block>

Figure 5:
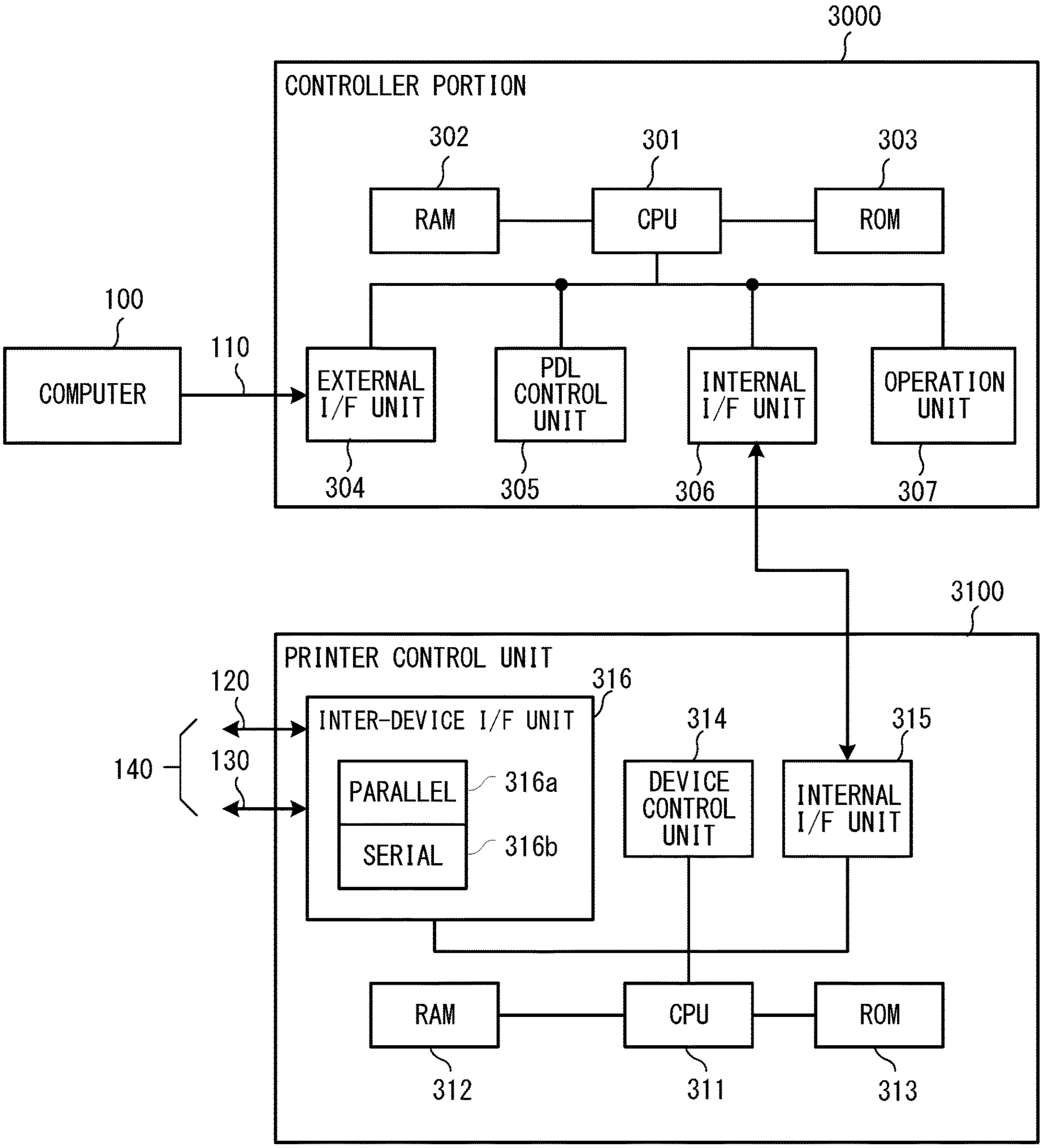
FIG. 5 is a control block diagram of an image forming apparatus.

FIG. 5 is a control block diagram of the image forming apparatus 101. As described in the above, the image forming apparatus 101 includes the controller unit 3000 and the printer control unit 3100. Each of the controller unit 3000 and the printer control unit 3100 includes a CPU (Central Processing Unit), a RAM (Random Access Memory), and a ROM (Read Only Memory).

The controller unit 3000 includes, in addition to a CPU 301, a RAM 302, and a ROM 303, an external I/F unit 304, a PDL (Page Description Language) control unit 305, an internal I/F unit 306, and an operation unit 307. The CPU 301 is connected, via an address bus and a data bus, to ROM 303, which stores a control program, and RAM 302, which provides a work area at the time of processing. The CPU 301 controls an operation of the image forming apparatus 101 as a whole, by executing the control program.

The external I/F unit 304 is a communication interface, which performs a communication control with the computer 100 through the network 110. CPU 301 communicates with the computer 100 via the external I/F unit 304. A PDL control unit 305 performs processing, storage, image processing and the like for the image data and the document data obtained from the computer 100 via the external I/F unit 304 to generate an image signal and a timing signal. The internal I/F unit 306 is a communication interface which controls communication with the printer control unit 3100. The CPU 301 communicates with the printer control unit 3100 via the internal I/F unit 306.

The operation unit 307 is a user interface having an input interface and an output interface. The input interface is a key button and a touch panel. The output interface is a display and a speaker. A user can input instructions and data to the CPU 301 by operating the input interface. The CPU 301 notifies an operation status and displays the operation screen with use of the output interface.

The printer control unit 3100 includes, in addition to a CPU 311, a RAM 312, and a ROM 313, a device control unit 314, an internal I/F unit 315, and an inter-device I/F unit 316. The CPU 311 is connected, via an address bus and a data bus, to ROM 313, which stores the control program, and RAM 312, which provides the work area at the time of processing. The CPU 311 controls, by executing a control program, image forming processing performed by the image forming apparatus 101. Further, the CPU 311 transmits the instruction for controlling the operation of the sheet treating apparatus via the inter-device I/F unit 316.

The device control unit 314 is an electric circuit having an input/output port for controlling a component for forming an image in the image forming apparatus 101. The internal I/F unit 315 is a communication interface which controls communication with the controller unit 3000. The printer control unit 3100 transmits and receives the image signal and the timing signal to and from the controller unit 3000 via the internal I/F unit 315. The inter-device I/F unit 316 communicates with, via the first signal line 120, the second signal line 130, and the third signal line 140, the first sheet feeding device 102, the second sheet feeding device 103, and the third sheet feeding device 104. The printer control unit 3100 transmits and receives the sheet information and the timing information, via the inter-device I/F unit 316, to and from the first sheet feeding device 102, the second sheet feeding device 103, and the third sheet feeding device 104. The inter-device I/F unit 316 includes a parallel port 316*a* and a serial port 316*b*. Therefore, the inter-device I/F unit 316 can perform communication using parallel communication as well as serial communication.

The CPU 311 receives the image signal, the sheet information, and the timing information from the controller unit 3000 via the internal I/F unit 315. The CPU 311 controls the device control unit 314 according to the image signal to form an image on a sheet. Further, the CPU 311 transmits and receives, via the inter-device I/F unit 316, the sheet information and the timing information to and from the first sheet feeding device 102, the second sheet feeding device 103, and the third sheet feeding device 104 to control the sheet conveyance operation.

Figure 6A:
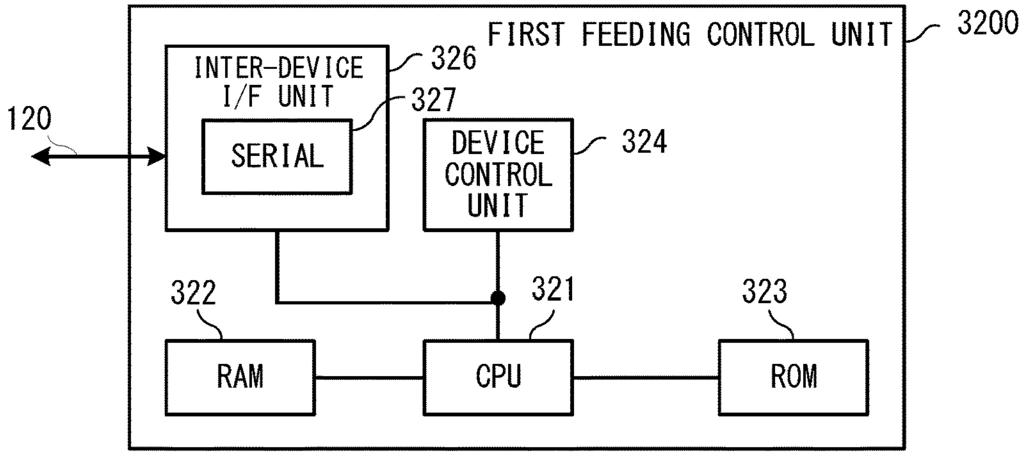
FIG. 6A is a control block diagram of a first sheet feeding device.
Figure 6B:
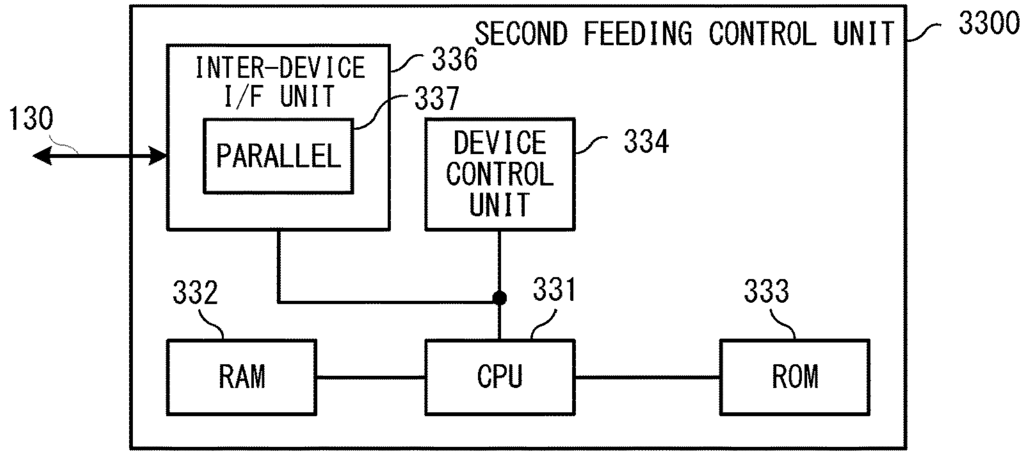
FIG. 6B is a control block diagram of a second sheet feeding device.
Figure 6C:
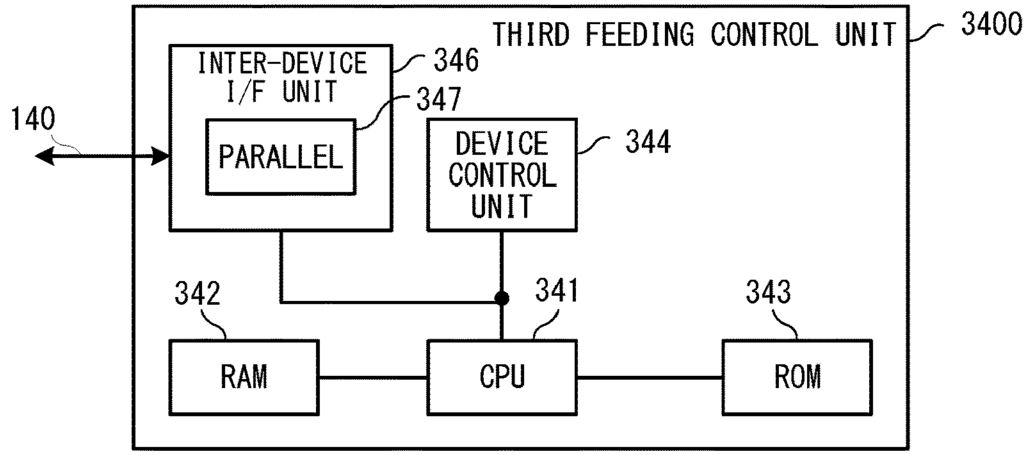
FIG. 6C is a control block diagram of a third sheet feeding device.

FIGS. 6A to 6C are control block diagrams of the first sheet feeding device 102, the second sheet feeding device 103, and the third sheet feeding device 104. As described in the above, the first sheet feeding device 102 includes the first feeding control unit 3200. The second sheet feeding device 103 includes the second feeding control unit 3300. The third sheet feeding device 104 includes the third feeding control unit 3400. FIG. 6A represents the first feeding control unit 3200. FIG. 6B represents the second feeding control unit 3300. FIG. 6C represents the third feeding control unit 3400. The first feeding control unit 3200, the second feeding control unit 3300, and the third feeding control unit 3400 have similar configurations.

The first feeding control unit 3200 includes a CPU 321, a RAM 322, a ROM 323, a device control unit 324, and an inter-device I/F unit 326. The inter-device I/F unit 326 includes a serial port 327 to perform serial communication with the image forming apparatus 101 via the first signal line 120. The second feeding control unit 3300 includes a CPU 331, a RAM 332, a ROM 333, the device control unit 334, and an inter-device I/F unit 336. The inter-device I/F unit 336 includes a parallel port 337 to perform parallel communication with the image forming apparatus 101 via the second signal line 130. The third feeding control unit 3400 includes a CPU 341, a RAM 342, a ROM 343, the device control unit 344, and an inter-device I/F unit 346. The inter-device I/F unit 346 includes a parallel port 347 to perform the parallel communication with the image forming apparatus 101 via the third signal line 140.

Hereinafter, the first feeding control unit 3200 will be described, and a description of the second feeding control unit 3300 and the third feeding control unit will be omitted. The CPU 321 is connected, via the address bus and the data bus, to ROM 323, which stores the control program, and RAM 322, which provides the work area at the time of processing. The CPU 321 controls, by executing a control program, sheet conveyance and sheet processing performed by the first sheet feeding device 102. The device control unit 324 is an electric circuit having an input/output port for controlling operations of components of the first sheet feeding device 102. The inter-device I/F unit 326 is a communication interface to transmit and receive the sheet information and the timing information to and from the image forming apparatus 101 via the first signal line 120. The CPU 321 controls conveyance of the sheet by the device control unit 324 based on the sheet information and the timing information obtained from the image forming apparatus 101 via the inter-device I/F unit 326. It is noted that functions achieved by the CPU 301 may be achieved by a CPU(s), an ASIC or an MPU(s).

<Internal Configuration of Image Forming System>

Figure 7:
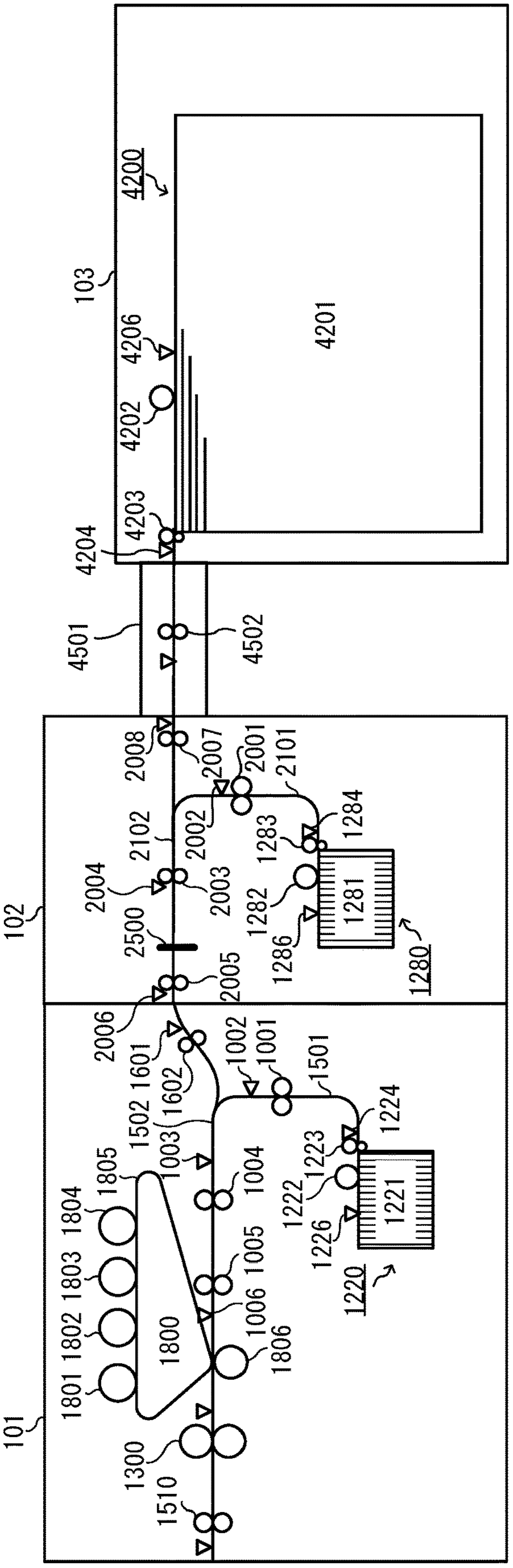
FIG. 7 is an inner configuration diagram of an image forming system.

FIG. 7 is an internal configuration diagram of the image forming system. This image forming system has a configuration in which the image forming apparatus 101, the first sheet feeding device 102, and second sheet feeding device 103 are included, as illustrated in FIG. 1D. In the sheet conveyance direction, the first sheet feeding device 102 is connected to an upstream side of the image forming apparatus 101. Further, the second sheet feeding device 103 is connected to the upstream side of the first sheet feeding device 102.

<Configuration of the Image Forming Apparatus 101>

The image forming apparatus 101 includes a sheet feeding unit 1220 for accommodating a sheet and feeding the accommodated sheet, a conveyance mechanism of the sheet, an image forming unit 1800, and a fixing device 1300. During conveyance of the sheet by the conveyance mechanism, an image is transferred on the sheet by the image forming unit 1800, then the transferred image is fixed by the fixing device 1300. The CPU 301 of the controller unit 3000 starts feeding of the sheet from the sheet feeding unit 1220, in response to a printing instruction from the operation unit 307 and a printing instruction from the computer 100, and performs the image forming process by the image forming unit 1800.

The sheet feeding unit 1220 includes a sheet storage 1221 in which sheets are accommodated. A pickup roller 1222 and a sheet surface sensor 1226 are provided on an upper part of the sheet feeding unit 1220. The sheet storage 1221 is controlled by a lift motor (not shown) and the sheet surface sensor 1226 such that an uppermost sheet in the sheet storage 1221 is in contact with the pickup roller 1222. The sheet surface sensor 1226 detects a position of the uppermost sheet in the sheet storage 1221. The lift motor is controlled according to a detection result of the sheet surface sensor 1226, as a result, the sheet storage 1221 moves up and down.

The feeding mechanism includes a vertical path 1501 and a horizontal path 1502 as conveyance paths. The sheet fed from the sheet feeding unit 1220 is conveyed to the horizontal path 1502 via the vertical path 1501. The vertical path 1501 is provided with the pickup roller 1222, a sheet feeding roller 1223, and a vertical path roller 1001 in this order, from the upstream side in the sheet conveyance direction. A sheet feed sensor 1224 is provided on a downstream side of the sheet feeding roller 1223, and a vertical path sensor 1002 is provided on a downstream side of the vertical path roller 1001.

The pickup roller 1222 picks up the uppermost sheet of the sheet storage 1221 and conveys it to the sheet feeding roller 1223. The sheet feeding roller 1223 is a pair of rollers (including an upper roller and lower roller), the upper roller rotates in a sheet conveying direction, and the lower roller rotates in a direction opposite to the sheet conveying direction. As a result, the sheet feeding roller 1223 separates the sheets one by one and conveys each separated sheet to the vertical path roller 1001. The sheet feed sensor 1224 detects the sheet conveyed from the sheet feeding roller 1223. In a case where the sheet feed sensor 1224 does not detect the sheet within a predetermined time from the start of picking up the sheet by the pickup roller 1222, the CPU 311 of the printer control unit 3100 determines that a jam has occurred and stops the conveyance of the sheet. In a case where the sheet feed sensor 1224 detects the sheet and remains in a detected state even after a lapse of a predetermined time, the CPU 311 of the printer control unit 3100 determines that the jam has occurred and stops the conveyance of the sheet.

The vertical path roller 1001 guides the sheet conveyed through the vertical path 1501 to the horizontal path 1502. The vertical path sensor 1002 is used for detecting an occurrence of the jam, similar to the sheet feed sensor 1224. In the horizontal path 1502, a pre-registration roller 1004, a registration roller 1005, a secondary transfer unit 1806, a fixing device 1300, and a discharge roller 1510 is provided in this order from the upstream side in the sheet conveyance direction. A pre-registration sensor 1003 is provided on the upstream side of the pre-registration roller 1004. A resist sensor 1006 is provided on the downstream side of the registration roller 1005.

The sheet guided to the horizontal path 1502 is conveyed by the pre-registration roller 1004. Then, a skew correction of the tip side of the sheet with respect to the conveyance direction is performed by the registration roller 1005. The skew correction is performed according to the timing at which the pre-registration sensor 1003 detects the sheet.

The image forming unit 1800 includes photosensitive drums 1801, 1802, 1803, and 1804 and an intermediate transfer member 1805. The photosensitive drums 1801, 1802, 1803, and 1804 are photosensitive members on which the image is formed by, for example, steps of charging, exposing, and developing. Images of different colors are formed on the photosensitive drums 1801, 1802, 1803, and 1804. In this embodiment, a yellow image is formed on the photosensitive drum 1801. A magenta image is formed on the photosensitive drum 1802. A cyan image is formed on the photosensitive drum 1803. A black image is formed on the photosensitive drum 1804.

The intermediate transfer member 1805 is an endless belt-shaped image carrier, and is rotated clockwise in the figure. Images are sequentially superimposed and transferred from the photosensitive drums 1801, 1802, 1803, and 1804 according to the rotation of the intermediate transfer member 1805. As a result, a full-color image is formed on the intermediate transfer member 1805. The intermediate transfer member 1805 is rotated to convey the image to the secondary transfer unit 1806.

The registration roller 1005 conveys the sheet to the secondary transfer unit 1806 at a timing such that a position of the image on the intermediate transfer member 1805 and a position of the tip of the sheet are aligned after the skew correction. The alignment of the tip of the sheet and the image is performed, for example, by driving the registration roller 1005 based on a signal synchronized with the image formation. The image is transferred, from the intermediate transfer member 1805, on the sheet by the secondary transfer unit 1806. The image transfer is started at a timing at which the resist sensor 1006 detects the conveyed sheet, which is conveyed after having stopped the conveyance of the same. The sheet on which the image is transferred is conveyed to the fixing device 1300. The fixing device 1300 fixes the image on the sheet by heating and pressurizing the sheet on which the image is transferred. The sheet on which the image is fixed is discharged to the outside of the image forming apparatus 101 by the discharge roller 1510.

The feeding mechanism also has a configuration for guiding the sheet fed from the first sheet feeding device 102 to the horizontal path 1502. This configuration includes a sheet detection sensor 1601 and a conveyance roller 1602. The sheet detection sensor 1601 detects a sheet fed from the first sheet feeding device 102. When the sheet detection sensor 1601 detects the sheet, the conveyance roller 1602 starts rotating, and conveys the sheet fed from the first sheet feeding device 102 to the horizontal path 1502.

<Configuration of First Sheet Feeding Device 102>

The first sheet feeding device 102 includes a sheet feeding unit 1280 for accommodating the sheet and a feeding mechanism for conveying the sheet from the sheet feeding unit 1280 to the image forming apparatus 101.

The sheet feeding unit 1280 includes a sheet storage 1281 in which the sheet is stacked. A pickup roller 1282 and a sheet surface sensor 1286 are provided on the upper part of the sheet feeding unit 1280. The sheet storage 1281 is controlled by a lift motor (not shown) and a sheet surface sensor 1286 such that an uppermost sheet in the sheet storage 1281 is in contact with the pickup roller 1282. The sheet surface sensor 1286 detects a position of the uppermost sheet in the sheet storage 1281. The lift motor is controlled according to a detection result of the sheet surface sensor 1286, as a result, the sheet storage 1281 moves up and down.

The feeding mechanism includes a vertical path 2101 and a horizontal path 2102 as conveyance paths. The fed sheet is conveyed through the vertical path 2101 to the horizontal path 2102. A pickup roller 1282, a sheet feeding roller 1283, and a vertical path roller 2001 are provided in the vertical path 2101 in this order from the upstream side in the sheet conveyance direction. The sheet feed sensor 1284 is provided on the downstream side of the sheet feeding roller 1283, and the vertical path sensor 2002 is provided on the downstream side of the vertical path roller 2001. A horizontal path roller 2003 and a delivery roller 2005 are provided in the horizontal path 2102 in this order from the upstream side in the sheet conveyance direction. The horizontal path sensor 2004 is provided on the downstream side of the horizontal path roller 2003, and the delivery sensor 2006 is provided on the downstream side of the delivery roller 2005. A sheet stop position 2500 is provided between the horizontal path roller 2003 and the delivery roller 2005.

The sheets are fed one by one from the sheet storage 1281 to the vertical path 2101 by the pickup roller 1282 and the sheet feeding roller 1283. The sheets are separated and conveyed one by one in the same manner as in the sheet feeding unit 1220. At this time, an occurrence of the jam is monitored based on a detection result of the sheet feed sensor 1284.

The sheet conveyed to the vertical path 2101 is guided to the horizontal path 2102 by the vertical path roller 2001. At this time, the occurrence of the jam is monitored based on a detection result of the vertical path sensor 2002. The sheet guided to the horizontal path 2102 is conveyed via the horizontal path 2102 by the horizontal path roller 2003. In a case where the sheet is detected by the horizontal path sensor 2004, the horizontal path roller 2003 temporarily stops conveyance of the sheet at a timing at which the sheet is conveyed in a predetermined distance from when the horizontal path sensor 2004 detects the sheet. As a result, the tip of the sheet in the conveyance direction stops at a sheet stop position 2500. The sheet stop position 2500 is always the same position regardless of the sheet size.

The horizontal path roller 2003 restarts the conveyance of the sheet from the sheet stop position 2500 to the image forming apparatus 101 such that a timing of image forming in the image forming unit 1800 of the image forming apparatus 101 is adjusted to a timing at which the formed image arrives the secondary transfer unit 1806. After restarting of the conveyance, the sheet is delivered to the image forming apparatus 101 by the delivery roller 2005. The delivery sensor 2006 detects that the delivery of the sheet to the image forming apparatus 101 has been completed by monitoring the rear end of the sheet.

The feeding mechanism also has a configuration for guiding the sheet fed from the second sheet feeding device 103 to the horizontal path 2102. This configuration includes an inlet sensor 2008 and an inlet roller 2007. The inlet sensor 2008 detects the sheet fed from the second sheet feeding device 103. When the inlet sensor 2008 detects the sheet, the inlet roller 2007 starts rotating, and conveys the sheet fed from the second sheet feeding device 103 to the horizontal path 2102.

<Configuration of the Second Sheet Feeding Device 103>

The second sheet feeding device 103 includes a sheet feeding unit 4200 for accommodating the sheet and feeding the accommodated sheet and a feeding mechanism for conveying the sheet from the sheet feeding unit 4200 to the first sheet feeding device 102.

The sheet feeding unit 4200 includes a sheet storage 4201 in which the sheet is stacked. A pickup roller 4202 and a sheet surface sensor 4206 are provided on the upper part of the sheet feeding unit 4200. The sheet feeding unit 4200 is controlled by a lift motor (not shown) and a sheet surface sensor 4206 such that an uppermost sheet in the sheet feeding unit 4200 is in contact with the pickup roller 4202. The sheet surface sensor 4206 detects a position of the uppermost sheet in the sheet storage 4201. The lift motor is controlled according to a detection result of the sheet surface sensor 4206, as a result, the sheet storage 4201 moves up and down.

The feeding mechanism is provided with the pickup roller 4202 and a sheet feeding roller 4203 in order from the upstream side in the sheet conveyance direction. A sheet feed sensor 4204 is provided in the downstream side of the sheet feeding roller 4203. The sheets are fed one by one from the sheet storage 4201 by the pickup roller 4202 and the sheet feeding roller 4203. The sheets are separated and conveyed one by one in the same manner as in the sheet feeding unit 1220. At this time, an occurrence of the jam is monitored based on a detection result of the sheet feed sensor 4204.

The fed sheet is delivered to the registration unit 4501 provided between the second sheet feeding device 103 and the first sheet feeding device 102. The registration unit 4501 includes a conveyance roller 4502 in the conveyance path. The registration unit 4501 corrects, while the sheet is conveyed by the conveyance roller 4502, the skew of the sheet and misalignment in a width direction orthogonal to the conveyance direction by a registration correction unit (not shown). The registration unit 4501 delivers the corrected sheet to the first sheet feeding device 102. The first sheet feeding device 102 delivers the sheet received from the second sheet feeding device 103 to the image forming apparatus 101.

<Configuration of the Third Sheet Feeding Device 104>

Figure 8:
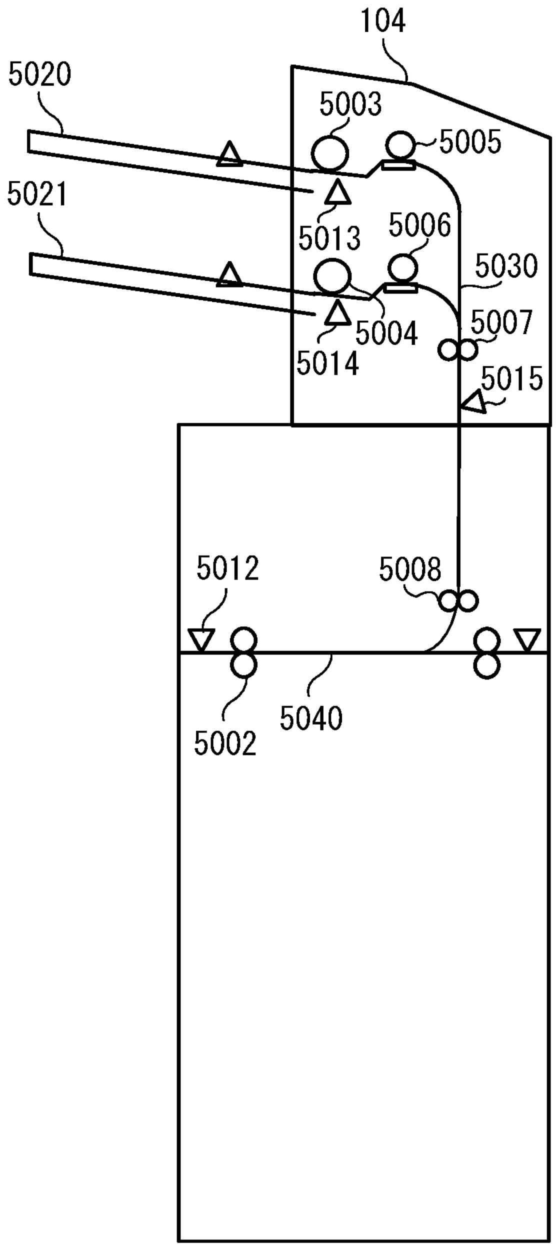
FIG. 8 is an internal configuration diagram of a third sheet feeding device.

FIG. 8 is an internal configuration diagram of a third sheet feeding device 104. The third sheet feeding device 104 includes an upper sheet feed tray 5020 and a lower sheet feed tray 5021, on which the sheets are to be stacked, and a conveyance mechanism for conveying the sheets.

The conveyance mechanism includes a conveyance path 5030 and a horizontal path 5040. In the conveyance path 5030, sheet feeding rollers 5003 and 5004, separation rollers 5005 and 5006, the conveyance roller 5007, and a registration roller 5008 are provided in order from the upstream side in the sheet conveyance direction. A resist sensor 5015 is provided on the downstream side of the conveyance roller 5007. A delivery roller 5002 is provided in the horizontal path 505. A delivery sensor 5012 is provided on the downstream side of the delivery roller 5002.

The sheet feeding roller 5003 contacts the uppermost sheet among the sheets stacked on the upper sheet feed tray 5020 and conveys it to the separation roller 5005. The separation roller 5005 separates the sheets conveyed from the sheet feeding roller 5003 one by one and conveys each separated sheet to the conveyance path 5030. Similarly, the sheet feeding roller 5004 contacts the uppermost sheet among the sheets stacked on the lower sheet feed tray 5021 and conveys it to the separation roller 5006. The separation roller 5006 separates the sheets conveyed from the sheet feeding roller 5003 one by one and conveys each separated sheet to the conveyance path 5030.

The sheet is conveyed in the conveyance path 5030 by the conveyance roller 5007. When the resist sensor 5015 detects the sheet, the conveyance roller 5007 conveys the sheet in a predetermined amount to abut a tip in the conveyance direction of the sheet against the registration roller 5008, which has been stopped, then, stops conveyance of the sheet. As a result, the sheet is stopped in a state in which a loop is formed, thereby the skew occurred during sheet feeding and conveyance operations is corrected.

After the tip of the sheet is abutted against the registration roller 5008 and stopped for a predetermined time, the conveyance roller 5007, the registration roller 5008, and the delivery roller 5002 are driven. Thereby the sheet is delivered from the conveyance path 5030 to the image forming apparatus 101 via the horizontal path 5040. By monitoring the rear end of the sheet, the completion of the delivery of the sheet to the image forming apparatus 101 can be detected.

<Communication Method Determination Process>

FIG. 9 is an explanatory diagram of a method for determining a communication method. FIG. 9 represents a communication method which can be used by each of the image forming apparatus 101 and the first sheet feeding device 102 to the third sheet feeding device 104 and the number of connectable signal lines (number of signals). Further, FIG. 9 represent the details of each of the signals of the first sheet feeding device 102 to the third sheet feeding device 104 and the signal line (signal connection destination) to be used.

In this example, the first signal line 120 includes two signal lines. The two signal lines as the first signal line 120 are used for transmitting a signal (transmission signal) from the image forming apparatus 101 and transmitting a signal (reception signal) to the image forming apparatus 101. The second signal line 130 includes three signal lines. The three signal lines as the second signal line 130 are used for transmitting an online signal, a sheet feed signal from the image forming apparatus 101, and a sheet absence signal to the image forming apparatus 101. Since the third signal line 140 is a signal line formed of a combination of the first signal line 120 and the second signal line 130, the third signal line 140 includes five signal lines. The five signal lines as the third signal line 140 are used in transmitting the online signal, an upper tray sheet feed signal from the image forming apparatus 101, a lower tray sheet feed signal from the image forming apparatus 101, an upper tray sheet absence signal to the image forming apparatus 101, and a lower tray sheet absence signal to the image forming apparatus 101.

It is a serial communication method and a parallel communication method that can be used in the image forming apparatus 101. The image forming apparatus 101 can perform communication, as to the serial communication, using the first signal line 120 having two signal lines, and can perform communication, as to the parallel communication, using the second signal line 130 having three signal lines. Thereby, five signal lines as a whole can be connected to the image forming apparatus 101, and communication can be established with use of the third signal line 140 having five signal lines. Since the third signal line 140 uses five signal lines during parallel communication, the two signal lines of the first signal line 120, which is originally used for the serial communication, are used for the parallel communication.

In the first sheet feeding device 102, the communication method is the serial communication. The first sheet feeding device 102 can perform, by connecting the same to the image forming apparatus 101 via the first signal line 120 which satisfies the number of signals required for communication, a sheet feeding operation using the serial communication according to a predetermined communication protocol. The first sheet feeding device 102 transmits and receives a transmission signal and a reception signal to and from the image forming apparatus 101 using two signal lines of the first signal line 120.

In the second sheet feeding device 103, the communication method is the parallel communication. The second sheet feeding device 103 can perform, by connecting the same to the image forming apparatus 101 using the second signal line 130 which satisfies the number of signals required for communication, a sheet feeding operation using general parallel communication. The second sheet feeding device 103 transmits and receives the online signal to and from the image forming apparatus 101 using the three signal lines of the second signal line 130, and obtains a sheet feed instruction (sheet feed signal) from the image forming apparatus 101. And, the second sheet feeding device 103 transmits a sheet absence signal, which represents that sheet is absent, to the image forming apparatus 101.

In the third sheet feeding device 104, which uses the communication method is parallel communication, its function may be limited by the number of signals available for connection with the image forming apparatus 101. That is, in a case where a sufficient number of signal lines is not available, the amount of communicated information is decreased and the function of the third sheet feeding device 104 is limited. Therefore, the image forming apparatus 101 communicates with the third sheet feeding device 104 assuming that the function of the third sheet feeding device 104 is limited, and executes an image forming operation. In a case where a sufficient number of signal lines is available, a sufficient amount of communicated information is ensured and the function of the third sheet feeding device 104 is not limited.

In a case where the number of the signal lines for connecting with the image forming apparatus 101 is two, the third sheet feeding device 104 is, by being connected to the image forming apparatus 101 using a first signal line 120 portion of the third signal line 140, allowed to perform a feeding operation only by the upper sheet feed tray 5020 in a condition under a function restriction. In this case, the third sheet feeding device 104 transmits and receives the online signal to and from the image forming apparatus 101 using the two signal lines of the first signal line 120, and obtains a sheet feed instruction (upper tray sheet feed signal) from the image forming apparatus 101.

In a case where the number of the signal lines for connecting with the image forming apparatus 101 is three, the third sheet feeding device 104 is, by being connected to the image forming apparatus 101 using a second signal line 130 portion of the third signal line 140, allowed to perform feeding operations by the upper sheet feed tray 5020 and the lower sheet feed tray 5021 in a condition under the function restriction. In this case, the third sheet feeding device 104 transmits and receives the online signal to and from the image forming apparatus 101 using the three signal lines of the second signal line 130, and obtains sheet feed instructions (upper tray sheet feed signal, lower tray sheet feed instruction) from the image forming apparatus 101.

In a case where the number of the signal lines for connecting with the image forming apparatus 101 is five, the third sheet feeding device 104 is connected to the image forming apparatus 101 by the third signal line 140 (first signal line 120 and second signal line 130). In this case, the first signal line 120, which is originally used for serial communication, is used for parallel communication. As a result, the third sheet feeding device 104 is allowed to perform the feeding operations of the upper sheet feed tray 5020 and the lower sheet feed tray 5021, and allowed to perform a sheet absence operations of the upper sheet feed tray 5020 and the lower sheet feed tray 5021 in a condition under a normal function. The third sheet feeding device 104 transmits and receives the online signal to and from the image forming apparatus 101 using, for example, the three signal lines of the second signal line 130, and obtains sheet feed instructions (upper tray sheet feed signal, lower tray sheet feed signal) from the image forming apparatus 101. The third sheet feeding device 104 transmits an upper tray sheet absence signal and a lower tray sheet absence signal, both indicate that the sheet is absent, to the image forming apparatus 101 using two signal lines of the first signal line 120.

FIG. 10 is a flowchart representing determining processing of the communication method between the image forming apparatus 101 and the first to third sheet feeding devices 102 to 104. This processing is performed by executing a control program stored in the ROM 313 by the CPU 311 of the printer control unit 3100 of the image forming apparatus 101.

The CPU 311 obtains configuration information representing a configuration of the image forming system from the controller unit 3000 (Step S101). The configuration information represents a connection configuration of the sheet feeding device connected to the image forming apparatus 101.

FIG. 11 is an explanatory diagram of configuration information. The configuration information is represented by a combination number representing a combination of the connection of the image forming apparatus 101, the first sheet feeding device 102, the second sheet feeding device 103, and the third sheet feeding device 104. The combination number may be previously set in the controller unit 3000 by a service engineer who builds the image forming system using the operation unit 307. In addition, the printer control unit 3100 may perform transmission of signals, at the time of starting up, to the first sheet feeding device 102, the second sheet feeding device 103, and the third sheet feeding device 104 to determine automatically the combination number among connectable combinations based on presence of absence of a reply in response to the transmission of the signals.

The CPU 311, after obtaining the configuration information, determines a communication method for the connected sheet feeding device using the configuration information (Step S102). FIG. 12 is an explanatory diagram of a communication method determination process using the configuration information.

In a case where the combination number is "1", none of the first sheet feeding device 102, the second sheet feeding device 103, and the third sheet feeding device 104 is connected to the image forming apparatus 101. Therefore, the image forming apparatus 101 does not communicate with any device, and the communication method is not determined. In a case where the combination number is "2", the first sheet feeding device 102 is connected to the image forming apparatus 101. Therefore, the image forming apparatus 101 and the first sheet feeding device 102 perform serial communication using the first communication method via the first signal line 120. In a case where the combination number is "3", the second sheet feeding device 103 is connected to the image forming apparatus 101. Therefore, the image forming apparatus 101 and the second sheet feeding device 103 perform parallel communication using the second communication method via the second signal line 130. In a case where the combination number is "4", the first sheet feeding device 102 and the second sheet feeding device 103 are connected to the image forming apparatus 101. Therefore, the image forming apparatus 101 and the first sheet feeding device 102 perform serial communication using the first communication method via the first signal line 120. The image forming apparatus 101 and the second sheet feeding device 103 perform parallel communication using the second communication method via the second signal line 130. In a case where the combination number is "5", the second sheet feeding device 103 and the third sheet feeding device 104 are connected to the image forming apparatus 101. Therefore, the image forming apparatus 101 and the first sheet feeding device 102 perform serial communication using the first communication method via the first signal line 120. The image forming apparatus 101 and the third sheet feeding device 104 perform parallel communication using the third communication method via the second signal line 130 portion of the third signal line 140. Since communication is performed via the second signal line 130 as the third signal line 140, the function of the third sheet feeding device 104 is restricted (function restriction 2). In a case where the combination number is "6", the second sheet feeding device 103 and the third sheet feeding device 104 are connected to the image forming apparatus 101. Therefore, the image forming apparatus 101 and the second sheet feeding device 103 perform parallel communication using the second communication method via the second signal line 130. The image forming apparatus 101 and the third sheet feeding device 104 perform parallel communication using the third communication method via the first signal line 120 as the third signal line 140. Since communication is performed via the first signal line 120 as the third signal line 140, the function of the third sheet feeding device 104 is restricted (function restriction 1). In a case where the combination number is "7", the third sheet feeding device 104 is connected to the image forming apparatus 101. Therefore, the image forming apparatus 101 and the third sheet feeding device 104 perform parallel communication using the third communication method via the third signal line 140 (the first signal line 120 and the second signal line 130). Since communication is performed via the five signal lines of the third signal line 140, the function of the third sheet feeding device 104 is not restricted, and the third sheet feeding device 104 operates with normal function.

CPU 311, which determined the communication method, performs a communication switching process according to the determined communication method (Step S103). After completing the communication switching process, CPU 311 ends the determination process of a communication method.

Figure 13:
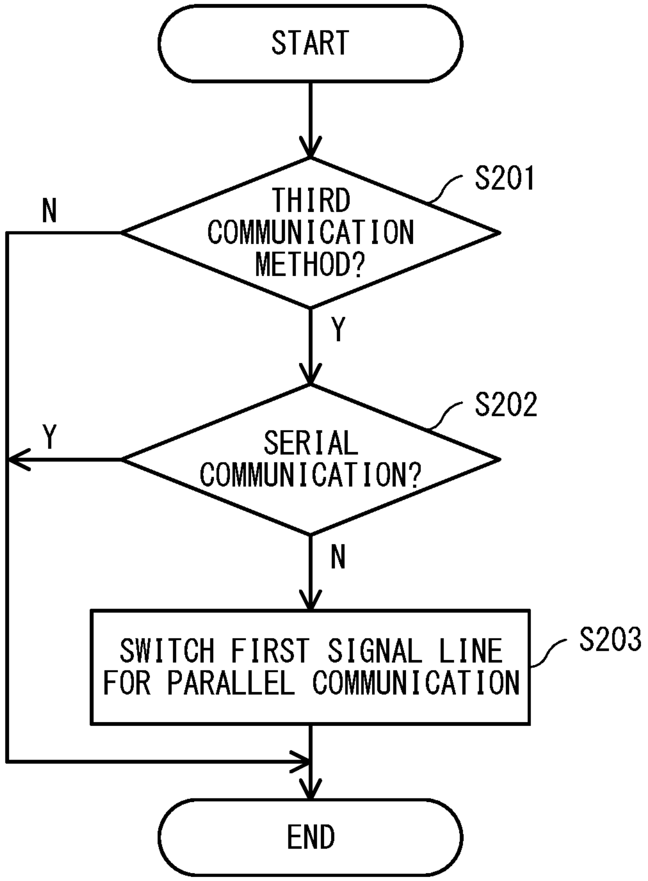
FIG. 13 is a flowchart illustrating processing for a communication switching process.

FIG. 13 is a flowchart illustrating processing for the communication switching process of Step S103. Generally, the first signal line 120 is used for serial communication. In the inter-device I/F unit 316 of the printer control unit 3100, the first signal line 120 is connected to the serial port 316*b*. However, when communication is performed using the third signal line 140 in the third communication method, parallel communication using the first signal line 120 may be performed. In a case where the third sheet feeding device 104 is operated with a normal function, and in a case where the second sheet feeding device 103 and the third sheet feeding device 104 are connected (function restriction 1), the above parallel communication is performed. Therefore, the communication switching is performed so that parallel communication using the first signal line 120 and the serial port 316*b* is available. By performing the communication switching, a sufficient amount of information of the communication using the third signal line 140 is ensured.

The CPU 311 determines whether the communication method determined in the process of Step S102 in FIG. 10 is the third communication method or not (Step S201). In a case where the communication method is the third communication method (Step S201: Y), the CPU 311 determines whether or not to perform the serial communication using the serial port 346*a* (Step S202). Due to the processing of Steps S201 and S202, it is determined whether or not the third sheet feeding device 104 is operated with function restriction 1 or with the normal function, since it is not necessary to perform the communication switching when the third sheet feeding device 104 operates with the function restriction 2.

When the serial communication is not performed (Step S202: N), the CPU 311 switches the first signal line 120, which has been set for the serial communication, for the parallel communication and ends the process (Step S203). That is, the CPU 311 allows the serial port 316*b* of the inter-device I/F unit 316 to be used as a parallel port. In a case where the communication method is not the third communication method (Step S201: N), or in a case where it is necessary to use the serial communication though the communication method is the third communication method (Step S202: Y), the CPU 311 ends the process without communication switching. Thus, the serial port 316*b* can be used as a parallel port when the communication method is the third communication method and the serial communication is not performed.

As described above, the image forming apparatus 101 determines the communication method according to the connection configurations of the first sheet feeding device 102, the second sheet feeding device 103, and the third sheet feeding device 104. Therefore, even for a device in which many signal lines are used for communication such as the third sheet feeding device 104, it is possible to use the function according to the number of connected signals according to the remaining number of signals. By using the signal line used for conventional serial communication for parallel communication, the signal line for parallel communication can be expanded. As a result, the amount of information to be communicated increases, and the functions can be expanded and complicated control can be realized without using serial communication according to the communication protocol. By expanding the signal line for parallel communication in this way, it is possible to improve a degree of freedom in connecting the sheet treating apparatus to the image forming apparatus.

In the above description, the sheet feeding device has been described as an example of the sheet treating apparatus. However, the sheet treating apparatus may be any device which communicates with another device using a similar communication method. For example, a device, which receives the sheet discharged from the image forming apparatus, provided at a sheet discharge side such as a post-processing device, a stacking device and the like may be used as the sheet treating apparatus. Further, both the post-processing device and the sheet feeding device may be used as the sheet treating apparatus. For example, at least one of the two sheet treating apparatuses is a sheet feeding device. For example, at least one of the two sheet treating apparatuses is the device provided at the sheet discharge side. In any case, the image forming apparatus 101 can establish an optimum communication environment by determining the communication method based on the connection configuration of the sheet treating apparatus. In addition, the present invention can be applied to a system using a device which operates in cooperation with the sheet treating apparatus, as well as an image forming system in which the sheet treating apparatus is connected to an image forming apparatus.

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

This application claims the benefit of Japanese Patent Application No. 2020-025941, filed Feb. 19, 2020, which is hereby incorporated by reference herein in its entirety.

What is claimed is:

1. An image forming apparatus to which a sheet treating apparatus is to be connected, comprising:

a communication device, having a serial port used for serial communication with the sheet treating apparatus and a parallel port used for parallel communication with the sheet treating apparatus, configured to communicate with the sheet treating apparatus, one or more processors, at least one of the one or more processors operating to:

determine a communication method to communicate with the sheet treating apparatus based on configuration information representing a connection configuration of the sheet treating apparatus, and switch an operation of the serial port such that the serial port of the communication device is used in the parallel communication in a case where a determined communication method is a method in which the parallel communication is performed and the serial communication is not performed.

2. The image forming apparatus according to claim 1, wherein the at least one of the one or more processors operates to switch the operation of the serial port of the communication device such that the serial port is used in the parallel communication in a case where a function of the sheet treating apparatus which is connected to the image forming apparatus using the parallel communication and not using the serial communication is restricted.

3. The image forming apparatus according to claim 1, wherein the communication device performs the serial communication via a first signal line and performs the parallel communication via a second signal line, and wherein the communication device performs the parallel communication using the serial port via the first signal line in a case where the operation of the serial port is switched, by the at least one of the one or more processors, such that the serial port is used in the parallel communication.

4. The image forming apparatus according to claim 3, wherein the sheet treating apparatus includes a first sheet treating apparatus which performs the serial communication and a second sheet treating apparatus which performs the parallel communication, wherein, in a case where the first sheet treating apparatus and the second sheet treating apparatus are connected to the image forming apparatus, the communication device performs the serial communication with the first sheet treating apparatus via the first signal line and performs the parallel communication with the second sheet treating apparatus via the second signal line, and wherein the at least one of the one or more processors operates to control the communication device such that the communication device communicates with the first sheet treating apparatus in a state in which a function of the second sheet treating apparatus is restricted in a case where a function of the second sheet treating apparatus is not ensured by the information amount communicated via the second signal line.

5. The image forming apparatus according to claim 4, wherein at least one of the first sheet treating apparatus and the second sheet treating apparatus is a feeding device which feeds a sheet to the image forming apparatus.

6. The image forming apparatus according to claim 5, wherein at least one of the first sheet treating apparatus and the second sheet treating apparatus includes a device provided at a sheet discharge side, which receives a sheet, discharged from the image forming apparatus, on which an image is formed.

7. The image forming apparatus according to claim 3, wherein the sheet treating apparatus includes a first sheet treating apparatus which performs the parallel communication and a second sheet treating apparatus which performs the parallel communication, wherein, in a case where the first sheet treating apparatus and the second sheet treating apparatus are connected to the image forming apparatus, the at least one of the one or more processors operates to switch the operation of the serial port of the communication device such that the serial port is used in the parallel communication, and wherein the communication device performs the parallel communication with the first sheet treating apparatus via the second signal line and performs the parallel communication with the second sheet treating apparatus via the first signal line.

8. The image forming apparatus according to claim 7, wherein at least one of the first sheet treating apparatus and the second sheet treating apparatus is a feeding device which feeds a sheet to the image forming apparatus.

9. The image forming apparatus according to claim 8, wherein at least one of the first sheet treating apparatus and the second sheet treating apparatus includes a device provided at a sheet discharge side, which receives a sheet, discharged from the image forming apparatus, on which an image is formed.

10. An image forming system in which a sheet treating apparatus and an image forming apparatus are connected, wherein the image forming apparatus comprises a communication device, having a serial port used for serial communication and a parallel port used for parallel communication, configured to:

communicate with the sheet treating apparatus;

determine a communication method to communicate with the sheet treating apparatus based on configuration information representing a connection configuration concerning the communication with the sheet treating apparatus; and switch an operation of the serial port such that the serial port of the communication device is used in the parallel communication in a case where a determined communication method is a method in which the parallel communication is performed and the serial communication is not performed.

11. The image forming system according to claim 10, wherein the communication device performs the serial communication via a first signal line and performs the parallel communication via a second signal line, wherein the sheet treating apparatus includes a first sheet treating apparatus which performs the serial communication and a second sheet treating apparatus which performs the parallel communication, wherein, in a case where the first sheet treating apparatus and the second sheet treating apparatus are connected to the image forming apparatus, the at least one of the one or more processors operates to switch the operation of the serial port of the communication device such that the serial port is used in the parallel communication, and wherein, in a case where an operation of the serial port is switched by the at least one of the one or more processors such that the serial port is used in the parallel communication, the communication device performs the parallel communication with the first sheet treating apparatus via the second signal line and performs the parallel communication with the second sheet treating apparatus via the first signal line.

12. A method of controlling an image forming system in which a sheet treating apparatus and an image forming apparatus are connected, the method being performed in the image forming system, and the image forming apparatus including a communication device, having a serial port used for serial communication and a parallel port used for parallel communication, configured to communicate with the sheet treating apparatus, wherein the image forming apparatus comprises one or more processors, wherein at least one of the one or more processors operates to:

determine a communication method to communicate with the sheet treating apparatus based on configuration information representing a connection configuration concerning the communication with the sheet treating apparatus; and switch an operation of the serial port such that the serial port of the communication device is used in the parallel communication in a case where a determined communication method is a method in which the parallel communication is performed and the serial communication is not performed.

13. The method of controlling an image forming system according to claim 12, wherein the communication device is configured to perform the serial communication via a first signal line and perform the parallel communication via a second signal line, wherein the sheet treating apparatus includes a first sheet treating apparatus which performs the serial communication and a second sheet treating apparatus which performs the parallel communication, wherein, in a case where the first sheet treating apparatus and the second sheet treating apparatus are connected to the image forming apparatus, the at least one of the one or more processors operates to switch the operation of the serial port such that the serial port is used in the parallel communication, and wherein, in a case where the operation of the serial port is switched by the at least one of the one or more processors such that the serial port is used in the parallel communication, the communication device performs the parallel communication with the first sheet treating apparatus via the second signal line and performs the parallel communication with the second sheet treating apparatus via the first signal line.

* * * * *